United States Patent
Dickinson et al.

(10) Patent No.: US 7,562,508 B2
(45) Date of Patent: Jul. 21, 2009

(54) SHELTER AND ASSOCIATED METHOD OF ASSEMBLY

(75) Inventors: Larry C. Dickinson, Apex, NC (US); Gregory J. Solomon, Clayton, NC (US); Paul Willard Peterson, Jr., Cary, NC (US); Joe Seiter, Raleigh, NC (US); Matt Sams, Apex, NC (US); Grant Godwin, Raleigh, NC (US); Thomas Goldberg, Bethesda, MD (US)

(73) Assignee: Martin Marietta Materials, Inc., Raleigh, NC (US)

( * ) Notice: Subject to any disclaimer, the term of this patent is extended or adjusted under 35 U.S.C. 154(b) by 462 days.

(21) Appl. No.: 10/982,602

(22) Filed: Nov. 5, 2004

(65) Prior Publication Data

US 2009/0056237 A1    Mar. 5, 2009

Related U.S. Application Data

(60) Provisional application No. 60/518,222, filed on Nov. 7, 2003.

(51) Int. Cl.
  *E04C 2/34*    (2006.01)
  *E04C 2/32*    (2006.01)

(52) U.S. Cl. .................................. 52/793.1; 52/783.11

(58) Field of Classification Search ................. 52/793.1, 52/396.06, 783.11, 790.1, 481.1, 396.03, 52/579, 745.02, 745.13, 745.05
See application file for complete search history.

(56) References Cited

U.S. PATENT DOCUMENTS

| | | | | |
|---|---|---|---|---|
| 3,214,949 A | * | 11/1965 | Johnson | 72/54 |
| 3,314,846 A | * | 4/1967 | Takato | 428/12 |
| D242,924 S | | 1/1977 | McKnight | |
| 4,126,972 A | | 11/1978 | Silen | |
| 4,315,962 A | * | 2/1982 | Skoien | 428/12 |
| 4,490,864 A | | 1/1985 | Wicker, Jr. | |
| 4,588,651 A | * | 5/1986 | Israeli | 428/594 |
| 4,615,158 A | | 10/1986 | Thornton | |
| 4,651,479 A | | 3/1987 | Kersavage | |
| 4,955,166 A | | 9/1990 | Qualline et al. | |
| 5,424,113 A | * | 6/1995 | Ray et al. | 428/178 |
| 5,670,220 A | * | 9/1997 | Skoien | 428/12 |
| 5,706,846 A | | 1/1998 | Sutton | |
| 5,732,510 A | | 3/1998 | Sutton et al. | |
| 5,791,118 A | * | 8/1998 | Jordan | 52/783.11 |
| 5,792,539 A | * | 8/1998 | Hunter | 428/72 |
| 5,794,402 A | | 8/1998 | Dumlao et al. | |

(Continued)

OTHER PUBLICATIONS

Industrial Laminates/Norplex, Inc. Micarta® StormBlocker™ information (15 pages) (Oct. 2001).

(Continued)

*Primary Examiner*—Richard E Chilcot, Jr.
*Assistant Examiner*—Ryan D Kwiecinski
(74) *Attorney, Agent, or Firm*—Barnes & Thornburg LLP

(57) ABSTRACT

A shelter comprises a roof, a floor, and a plurality of side walls secured to the floor and the roof. At least one of the floor, the roof, and the plurality of side walls comprises an exterior panel, an interior panel, and an attachment device secured to the exterior panel and the interior panel for relative movement of the exterior panel and the interior panel between collapsed and expanded positions. An associated method of assembling the shelter is disclosed.

19 Claims, 11 Drawing Sheets

U.S. PATENT DOCUMENTS

| | | | |
|---|---|---|---|
| 5,829,208 A | 11/1998 | Townley | |
| 5,870,866 A | 2/1999 | Herndon | |
| 5,930,961 A | 8/1999 | Beaudet | |
| 5,953,866 A | 9/1999 | Poole | |
| 6,023,806 A | 2/2000 | Dumlao et al. | |
| 6,044,607 A | 4/2000 | Dumlao et al. | |
| 6,070,378 A | 6/2000 | Dumlao et al. | |
| 6,081,955 A | 7/2000 | Dumlao et al. | |
| 6,108,998 A | 8/2000 | Dumlao | |
| 6,131,343 A | 10/2000 | Jackson, Jr. | |
| 6,151,841 A | 11/2000 | Green | |
| 6,161,345 A | 12/2000 | Hope et al. | |
| 6,235,367 B1 | 5/2001 | Holmes et al. | |
| 6,260,312 B1 | 7/2001 | Spene et al. | |
| 6,263,637 B1 | 7/2001 | Spene et al. | |
| 6,266,863 B1 | 7/2001 | Spene et al. | |
| 6,272,805 B1 * | 8/2001 | Ritter et al. | 52/309.11 |
| 6,308,466 B1 | 10/2001 | Moriarty | |
| 6,385,919 B1 | 5/2002 | McCarthy | |
| 6,393,776 B1 | 5/2002 | Waller et al. | |
| 6,412,231 B1 | 7/2002 | Palatin | |
| 6,415,558 B1 | 7/2002 | Cherry | |
| 6,434,896 B1 | 8/2002 | Mitchell | |
| 6,467,118 B2 | 10/2002 | Dumlao et al. | |
| 6,645,333 B2 | 11/2003 | Johnson et al. | |
| 6,676,785 B2 | 1/2004 | Johnson et al. | |
| 6,699,575 B1 * | 3/2004 | Dagher et al. | 428/292.4 |
| 6,764,083 B2 | 7/2004 | Bernard | |
| 6,785,992 B2 | 9/2004 | Chiarucci | |
| 7,051,489 B1 * | 5/2006 | Swiszcz et al. | 52/783.18 |
| 2002/0038529 A1 * | 4/2002 | Nelson | 52/2.22 |
| 2002/0066256 A1 | 6/2002 | Oberpriller et al. | |
| 2003/0079430 A1 | 5/2003 | Hanks | |
| 2003/0154679 A1 * | 8/2003 | Swiszcz et al. | 52/506.07 |
| 2004/0060245 A1 | 4/2004 | Loblick et al. | |
| 2004/0103614 A1 | 6/2004 | Hanks et al. | |
| 2004/0177568 A1 | 9/2004 | Hanks | |
| 2004/0221529 A1 * | 11/2004 | Zornes | 52/311.1 |
| 2006/0112655 A1 * | 6/2006 | Swiszcz et al. | 52/222 |
| 2006/0254204 A1 * | 11/2006 | Swiszcz et al. | 52/793.1 |

OTHER PUBLICATIONS

International Search Report, International Application No. PCT/US05/34827, mailed Oct. 12, 2007.

* cited by examiner

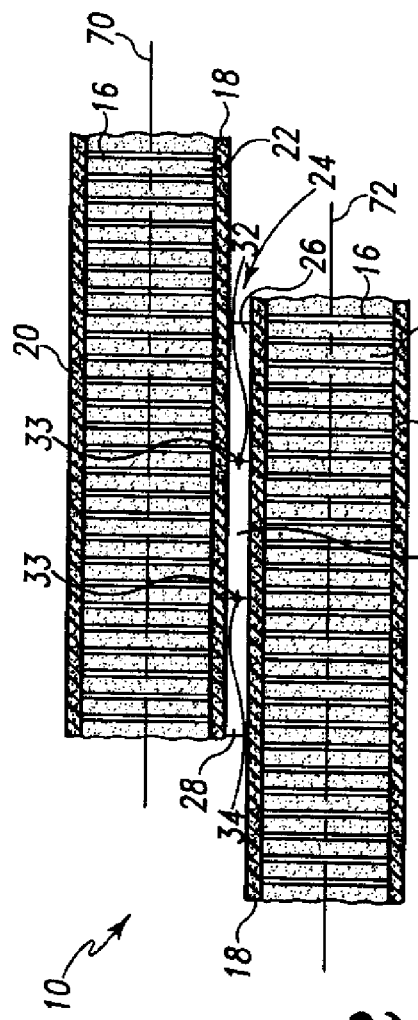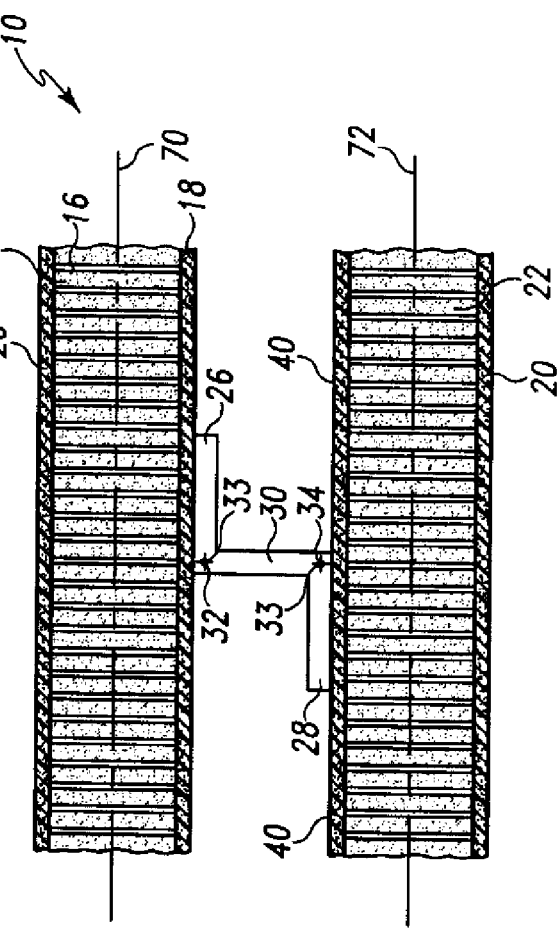
Fig. 2
Fig. 3

SHELTER AND ASSOCIATED METHOD OF ASSEMBLY

This application claims priority under 35 U.S.C. § 119(e) to U.S. Provisional Application No. 60/518,222 which was filed Nov. 7, 2003 and is hereby incorporated by reference herein.

FIELD OF THE DISCLOSURE

The present disclosure relates to a shelter and a method of assembling the shelter.

BACKGROUND OF THE DISCLOSURE

Shelters are used to provide shelter for people, equipment, munitions, supplies, and other objects. Such shelters may be used to protect its occupants from weather and other external elements such as ballistic and blast events.

SUMMARY OF THE DISCLOSURE

According to an aspect of the present disclosure, there is provided a shelter. The shelter comprises a roof, a floor, and a plurality of side walls secured to the floor and the roof. At least one of the roof, the floor, and the side walls comprises an exterior panel, an interior panel, and an attachment device secured to the exterior panel and the interior panel. One or both of the exterior and interior panels may be a composite.

The attachment device allows for relative movement of the exterior panel and the interior panel between collapsed and expanded positions. In the expanded position, the exterior panel and the interior panel are spaced farther apart from one another than in the collapsed position to define a cavity therebetween. A filler material such as an energy dissipation material (e.g., sand) may be disposed in the cavity.

According to another aspect of the disclosure, a method of assembling the shelter is provided. The method comprises the step of relatively moving the exterior and interior panels between the collapsed position and the expanded position and may comprises the step of disposing the filler material in the cavity.

BRIEF DESCRIPTION OF THE DRAWINGS

FIG. 2 is an end elevation view showing the structure in the collapsed position;

FIG. 3 is an end elevation view showing the structure in the expanded position;

DETAILED DESCRIPTION OF THE DRAWINGS

Figure 1:
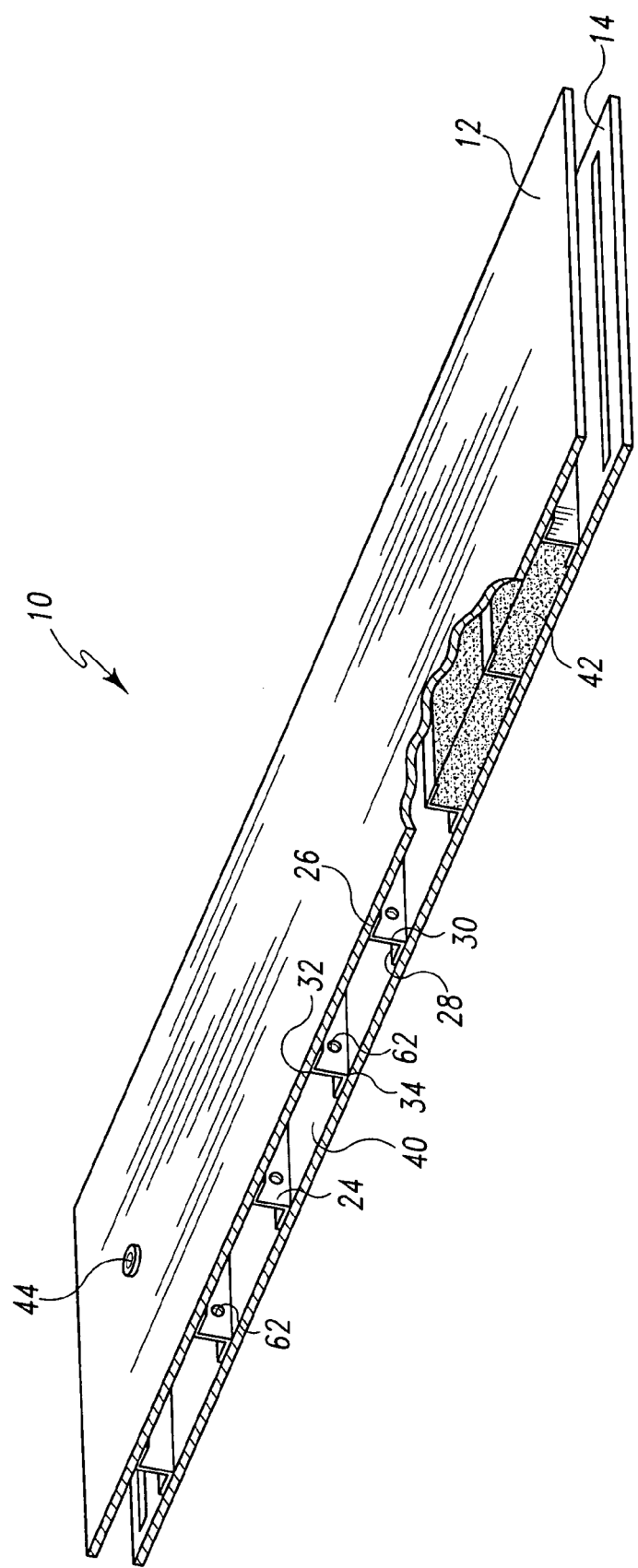
FIG. 1 is a perspective view showing a structure that is provided for use in a shelter and comprises a pair of panels and a plurality of attachment devices interconnecting the panels for movement of the panels relative to one another between a collapsed position shown in FIG. 2 and an expanded position shown in FIG. 3.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Figure 10:
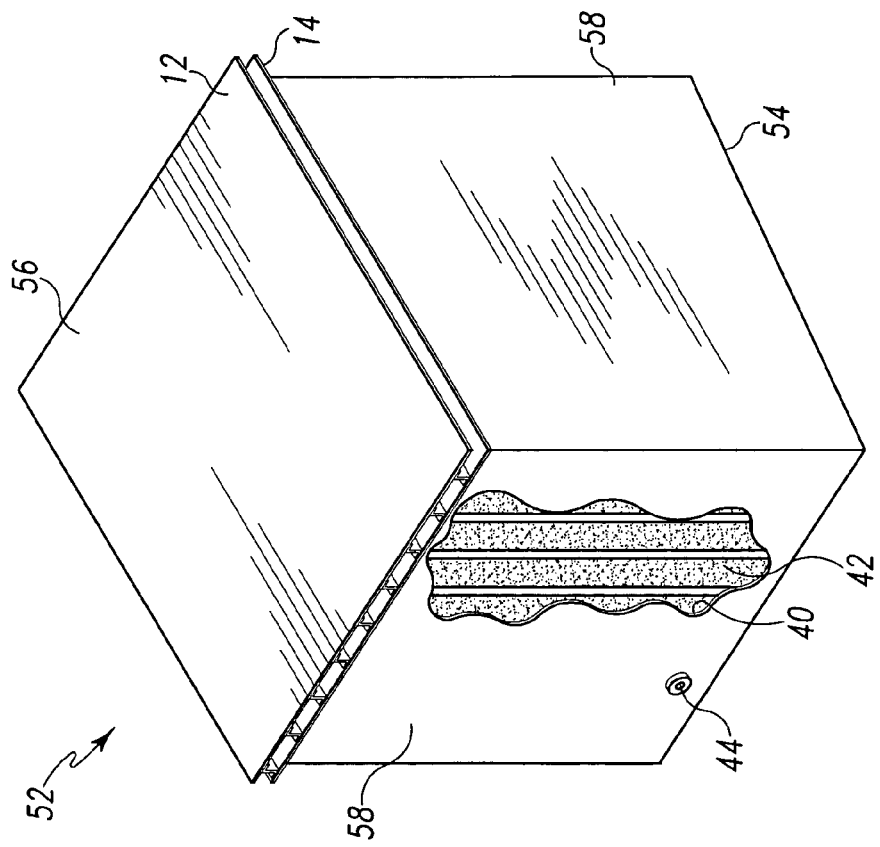
FIG. 10 is a perspective view showing the assembled shelter.

A structure 10 shown in FIG. 1 is provided for use in a shelter 52 shown in FIG. 10. The structure 10 comprises an exterior panel 12 and an interior panel 14 oppositely positioned from the panel 12. A number of attachment devices 24 are secured to the panels 12, 14 for relative movement of the panels 12, 14 between a collapsed position (FIG. 2) for transportation and storage of the structure 10 and an expanded position (FIG. 3) for use of the structure 10 in the shelter 52. In the expanded position, the panels 12, 14 are spaced farther apart from one another than in the collapsed position to define a number of cavities 40 therebetween. A filler material 42 may be disposed in the cavities 40.

Exemplarily, each panel 12, 14 is a composite panel such as a fiber reinforced polymer panel (FRP panel). Such an FRP panel may be formed of a polymer matrix composite material which includes a reinforcing element and a polymer resin. The FRP panel may be embodied as any type of FRP structure. Examples of such structures include, but are not limited to, a solid laminate, a pultruded or vacuum-infused sandwich panel (e.g., a panel having outer and inner layers with a core therebetween), or a pultruded panel (e.g., a panel having upper and lower layers with vertical or diagonal webs therebetween). In the case of where the FRP panel is embodied as a sandwich panel, the core type may include, but is not limited to, wood, foam and various types of honeycomb.

The matrix includes, for example, a thermosetting resin, although thermoplastic resins are also contemplated for use. Examples of thermosetting resins which may be used include, but are not limited to, unsaturated polyesters, vinyl esters, polyurethanes, epoxies, phenolics, and mixtures and blends thereof.

The reinforcing element may include E-glass fibers, although other reinforcements such as S-glass, carbon, KEVLAR®, metal, high modulus organic fibers (e.g. aromatic polyamides, polybenzamidazoles, and aromatic polyimides), and other organic fibers (e.g. polyethylene and nylon) may be used. Blends and hybrids of such materials may be used for the reinforcing element. Other suitable composite materials may be used for the reinforcing element including whiskers and fibers such as boron, aluminum silicate, basalt, carbon nanofibers, and other nanofibers.

The FRP panel may be embodied as any of the structures disclosed in U.S. Pat. Nos. 5,794,402; 6,023,806; 6,044,607; 6,070,378; 6,081,955; 6,108,998; 6,467,118 B2; 6,645,333; 6,676,785, the entirety of each of which is hereby incorporated by reference. It should be appreciated that the structures disclosed in the above-identified patents may be sized, scaled, dimensioned, orientated, or otherwise configured in any desired manner to fit the needs of a given design of the FRP panel.

A cover may be secured to the inner and outer layers of the FRP panel. Each cover may be embodied as any one or more of a variety of gels or other coating materials that provide, for example, weather protection. The cover may also be embodied as other types of materials such as metal layers. The cover may also be embodied as ballistic grade steel or other ballistic grade material. Different types of covers may be used to cover the exterior or interior surfaces of the FRP panel. For example, an exterior cover may be finished in a predetermined, desired exterior color, a brick façade, or even a camouflaged pattern. Similarly, an interior cover may be finished in an interior surface appearance, a wood-grain surface, or any other desired surface finish. The covers may be co-cured with other components of the FRP panel. The covers may be an integral part of or attached to the FRP panel.

Illustratively, each panel 12, 14 is configured as a sandwich panel, as shown in FIGS. 2 and 3. Each panel 12, 14 comprises a plurality of fibers 16, an inner layer 18, an outer layer 20 generally parallel to the inner layer 18, and a core 22. Each layer 18, 20 is made of a plurality of textile plies laminated together by use of resin. The core 22 is positioned in a gap between the pair of layers 18, 20. Each fiber 16 is inserted into the layers 18, 20 and the core 22 such that the fiber 16 is generally perpendicular to the layers 18, 20. Fiber 16 may have a variety of cross-sectional configurations including, but not limited to, crosses, I- or C-shaped cylinders, ellipses, columns, squares, tubes, waves, solid blocks or combinations thereof.

It is within the scope of this disclosure for one or both of the exterior panel 12 and the interior panel 14 not to be a composite. In such a case, the panel 12 and/or 14 may be a gypsum board, a liner, or made of a ballistic- and/or blast-grade metal (e.g., steel, aluminum).

Each attachment device 24 is secured to the inner layers 18 of each panel 12, 14 for movement of the panels 12, 14 between the collapsed and expanded positions. In both the collapsed and expanded positions, panels 12, 14 are generally parallel to one another. In particular, imaginary central planes 70, 72 of the panels 12, 14 are generally parallel to one another in the collapsed and expanded positions (planes 70, 72 are perpendicular to and extend out of the page in FIGS. 2 and 3).

Attachment device 24 comprises a first portion 26 secured to the inner layer 18 of the panel 12 and a second portion 28 secured to the inner layer 18 of the panel 14. A connecting portion 30 connects the first portion 26 and the second portion 28 for relative rotation between the connecting portion 30 and the first portion 26 about a first axis of rotation 32 and relative rotation between the connecting portion 30 and the second portion 28 about a second axis of rotation 34. Such relative rotation about the axes 32, 34 facilitates movement of the panels 12, 14 between the collapsed and expanded positions.

Each portion 26, 28, 30 is configured, for example, as a plate. Exemplarily, plates 26, 30 are secured to one another by use of, for example, a pin 33 as shown in FIGS. 2 and 3, or living hinge that establishes the axis 32 and plates 28, 30 are secured to one another by use of, for example, a pin 33 or living hinge that establishes the axis 34. In the collapsed position, the connecting plates 30 is non-perpendicular to the panels 12, 14. In the expanded position, the connecting plate 30 is generally perpendicular to the plates 26, 28 and the panels 12, 14. Each attachment device 24 is, for example, a hinge.

The filler material 42 may be disposed in the cavities 40. The filler material 42 may be an energy dissipation material (e.g., sand) to dissipate kinetic energy imparted to the panel 12 due to impacts against the panel 12 caused by any of a wide variety of impact sources such as ballistic and blast forces. The connecting plates 30 of a number of the attachment devices 24 may be formed to include holes 62 for communication of the filler material 42 between adjacent cavities 40 to facilitate introduction of the filler material 42 into the cavities 40 and removal of the filler material 42 from the cavities 40.

Structure 10 comprises a release 44 shown in FIG. 1. Release 44 is configured to release the material 42 from one or more of cavities 40. Such a release 44 may be secured to one or both of panels 12, 14. Further, there may be a release 44 for each cavity 40 or a single release 44 in communication with two or more of the cavities 40. Illustratively, structure 10 has one release 44 which is secured to the exterior panel 12 and is configured, for example, as a valve that can be opened to allow flow of material 42 from the one or more cavities 40 through a hole in structure 10 and can be closed to block flow of material 42 from the one or more cavities 40 through the hole in structure 10.

It is within the scope of this disclosure for a cover (not shown) to extend across the cavities 40 from panel 12 to panel 14 to enclose the cavities 40 and the material 42 disposed within the cavities 40. The cover may include an opening to allow introduction of the material 42 into the cavities 40.

Figure 4:
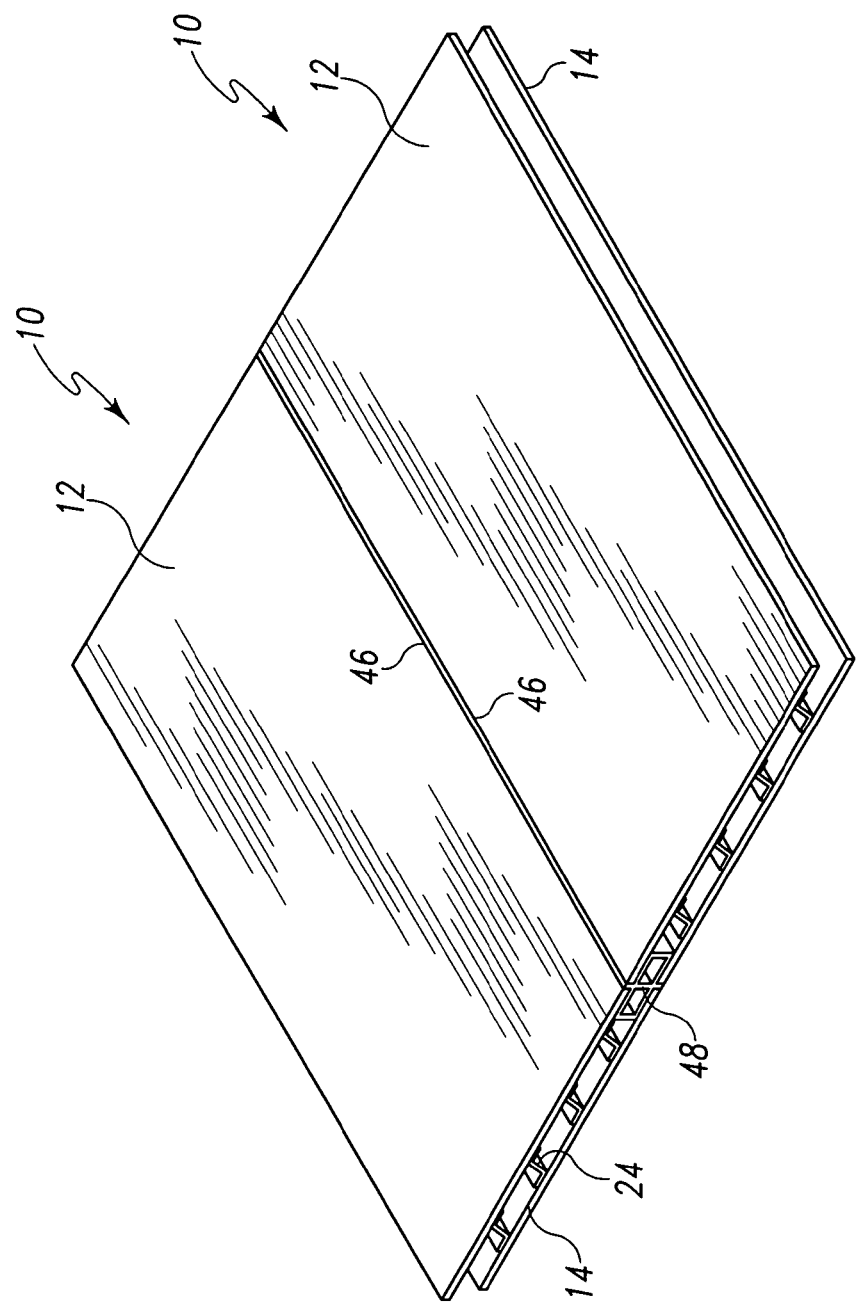
FIG. 4 is a perspective view showing a pair of structures secured to one another by a connector.

A pair of adjacent structures 10 may be secured to one another by use of a connector 48, as shown in FIG. 4. Connector 48 is secured to panels 12, 14 along edges 46 of panels 12, 14. Illustratively, the structures 10 cooperate to a provide a straight wall when connected by connector 48. It is within the scope of this disclosure for the structures 10 to be arranged to form a corner.

A wide variety of connectors may be used as connector 48. In one example, the connector 48 comprises tabs and tab-receiving spaces which connect adjacent structures 10. In such a case, the tabs and tab-receiving spaces may be formed in adjacent structures 10 during fabrication of the structures 10. In another example, the connector 48 comprises joints such as, but not limited to, dovetail joints or other interlocking joints formed in adjacent structures 10. In yet another example, the connector 48 comprises a mechanical fastener, a bonding material, and/or slots to connect adjacent structures 10.

Figure 11:
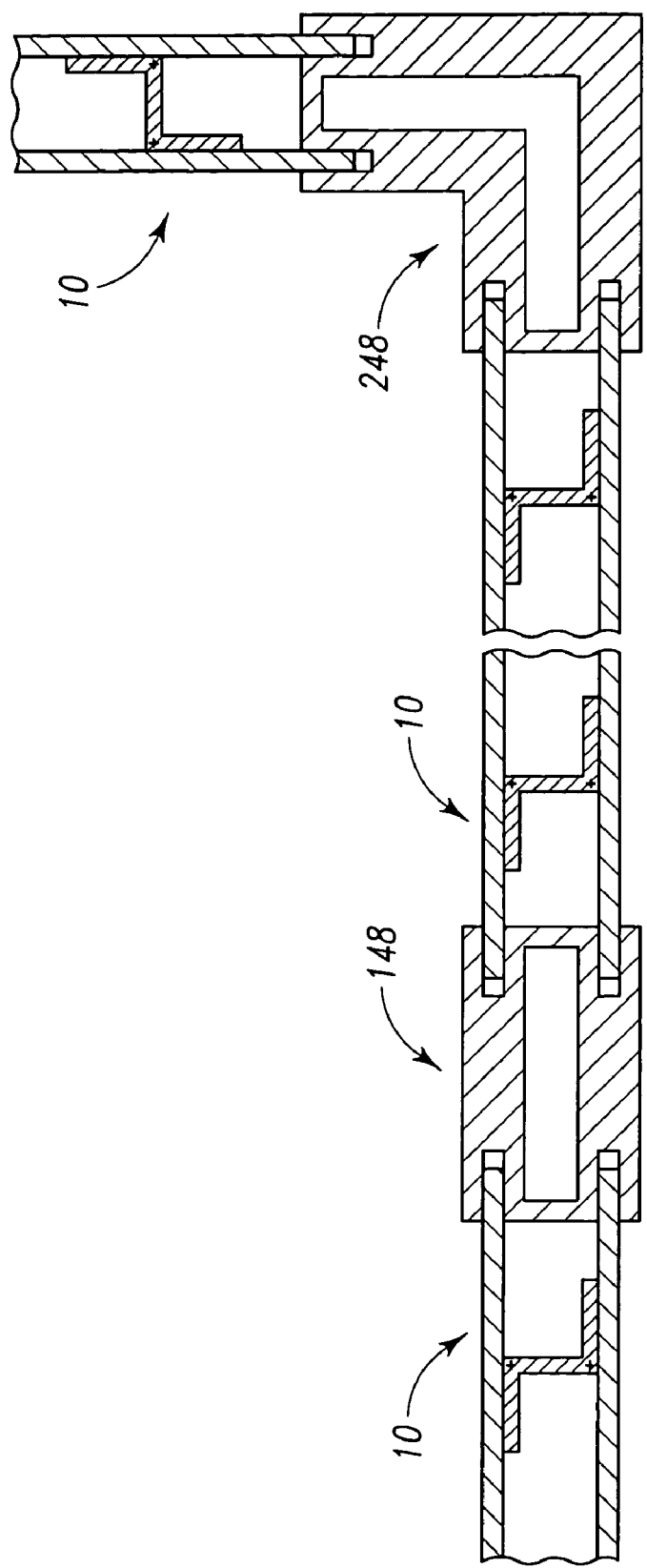
FIG. 11 is a sectional view showing connectors used to connect adjacent structures.

Two more exemplary connectors are shown in FIG. 11. For example, a connector 148 may be used to connect adjacent and parallel structures 10. In another example, a connector 248 may be used to connect adjacent and perpendicular structures 10 to provide a corner of the shelter 52.

Figure 12:
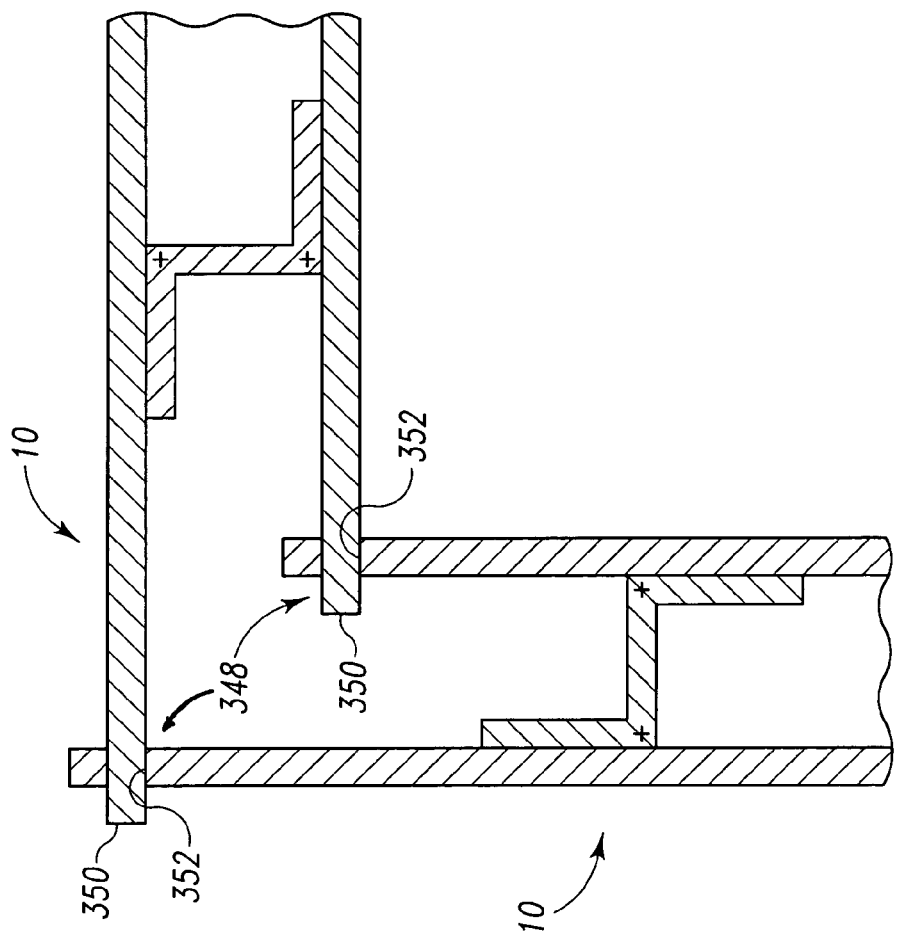
FIG. 12 is a sectional view showing adjacent structures coupled to one another at a corner.

Another exemplary connector 348 is shown in FIG. 12. The connector 348 is used to connect adjacent and perpendicular structures 10 to provide a corner of the shelter 52. Connector 348 comprises tabs 350 of one structure 10 which fit into tab-receiving spaces 352 of an adjacent structure 10 to lock the two structures 10 together at a corner.

Structure 10 may be used as each of a floor 54, a roof 56, and a plurality of side walls 58 of the shelter 52. Before assembly of shelter 52, each structure 54, 56, 58 can be moved to its collapsed position and two or more of structures 54, 56, 58 can be stacked on top of one another in a folded position to facilitate storage and transport thereof, as shown in FIG. 4.

Figure 5:
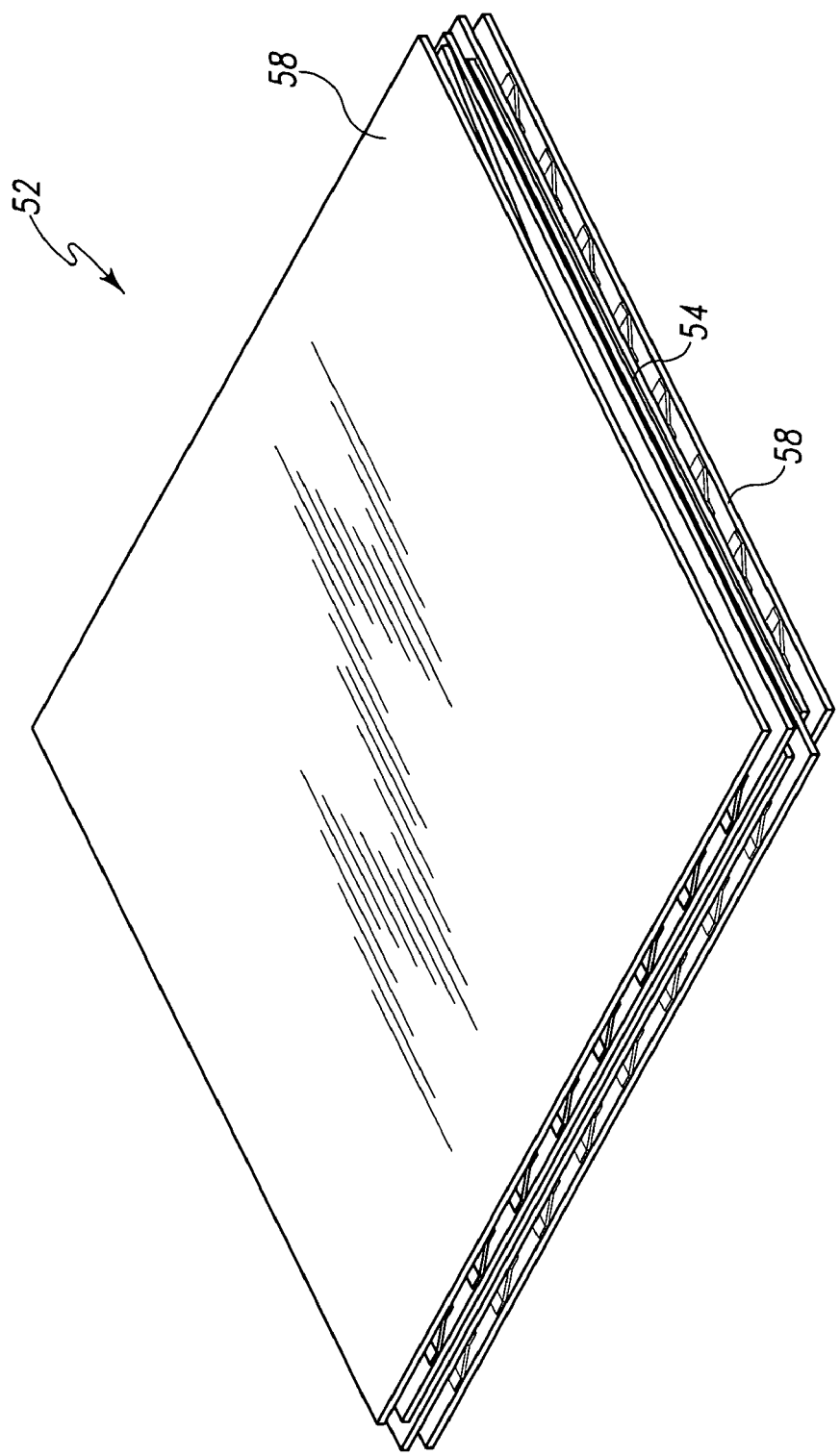
FIG. 5 is a perspective view showing structures of the shelter positioned in a folded position.
Figure 6:
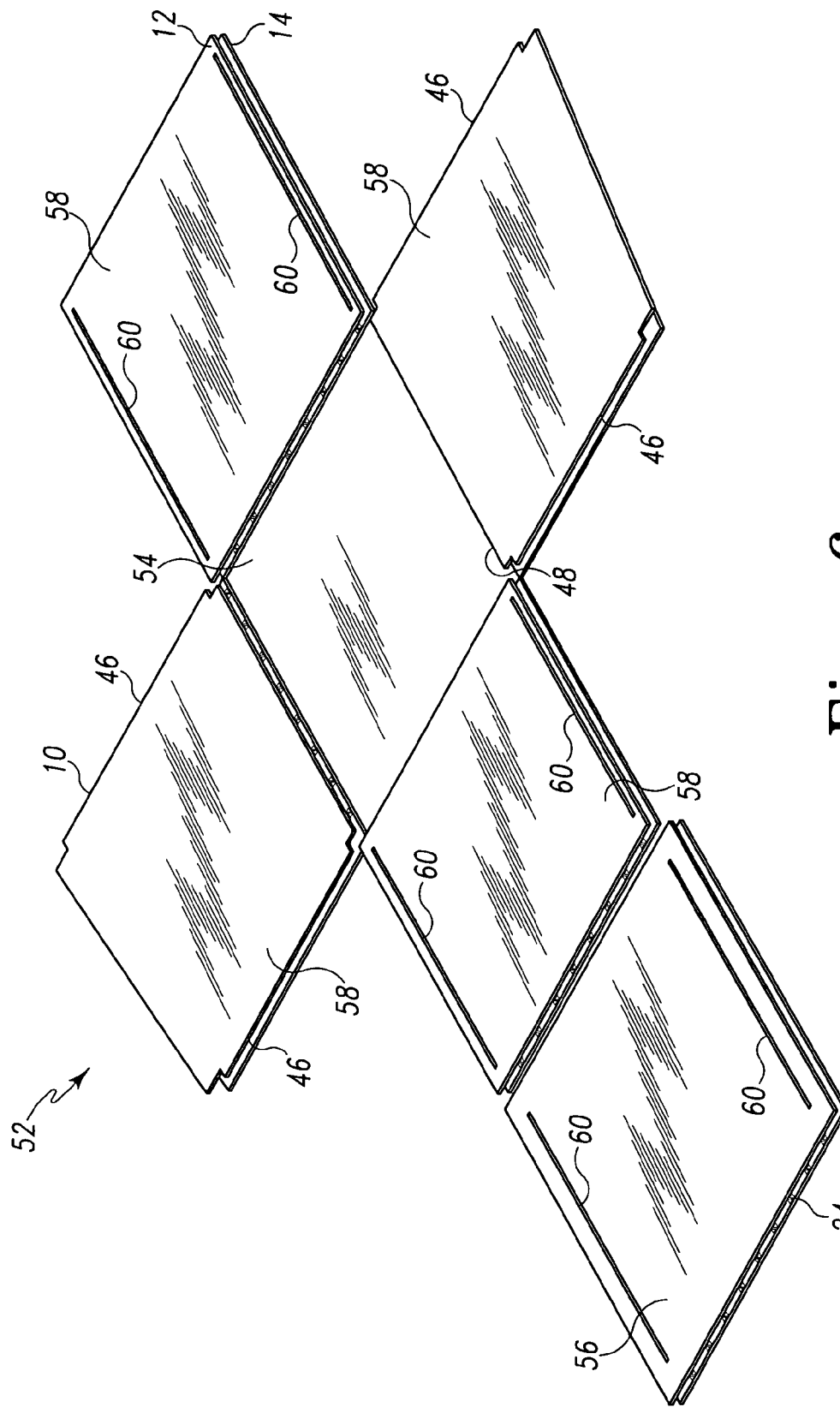
FIG. 6 is a perspective view showing the structures of the shelter positioned in an unfolded position.

To begin assembly of the shelter 52, each structure 54, 56, 58 is moved to its expanded position and the structures 54, 56, 58 are moved relative to one another to an unfolded position, as shown in FIG. 5. In the unfolded position, side walls 58 are secured to the floor 54.

Figure 7:
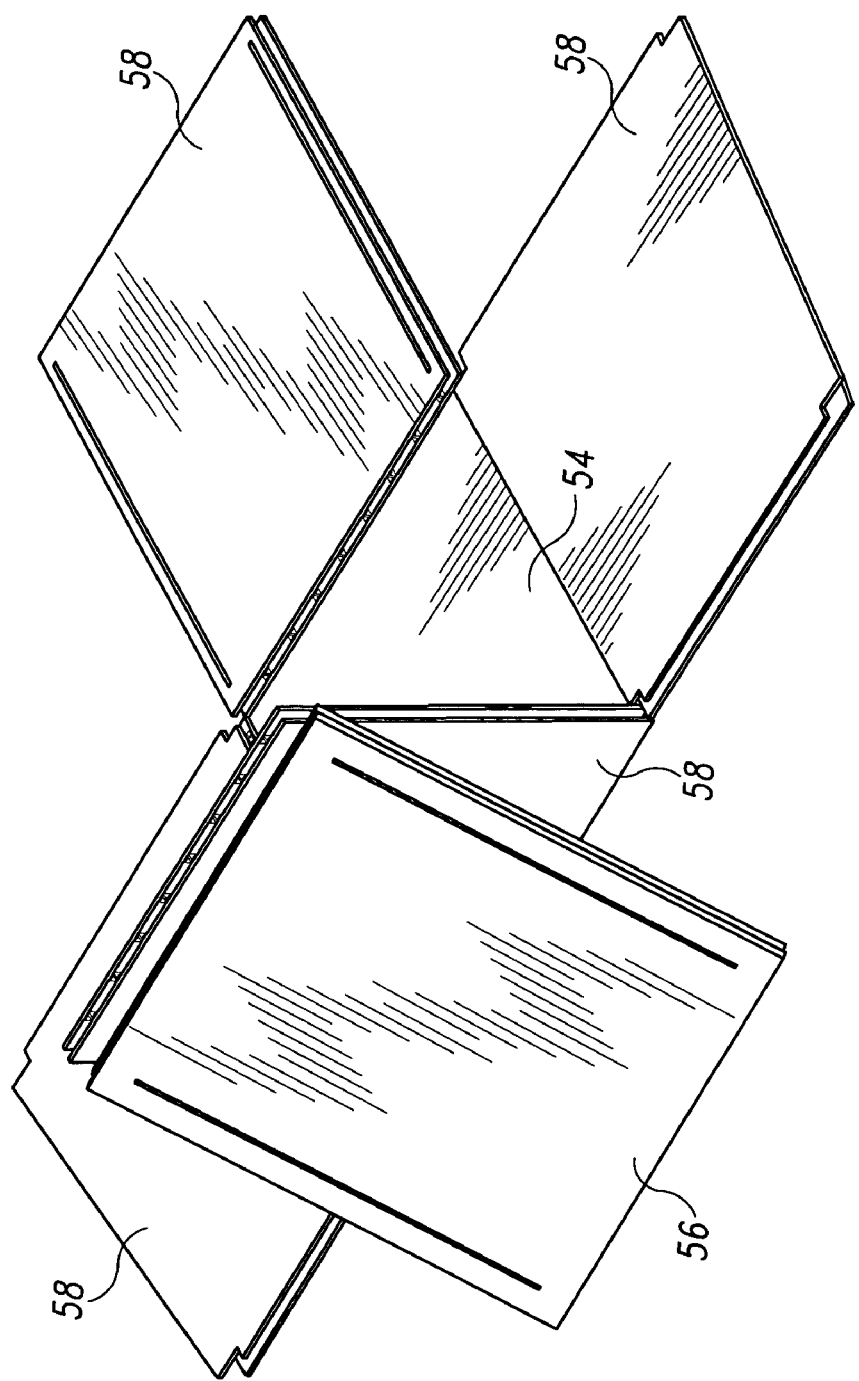
FIGS. 7-9 are perspective views showing assembly of the shelter with the structures.
Figure 8:
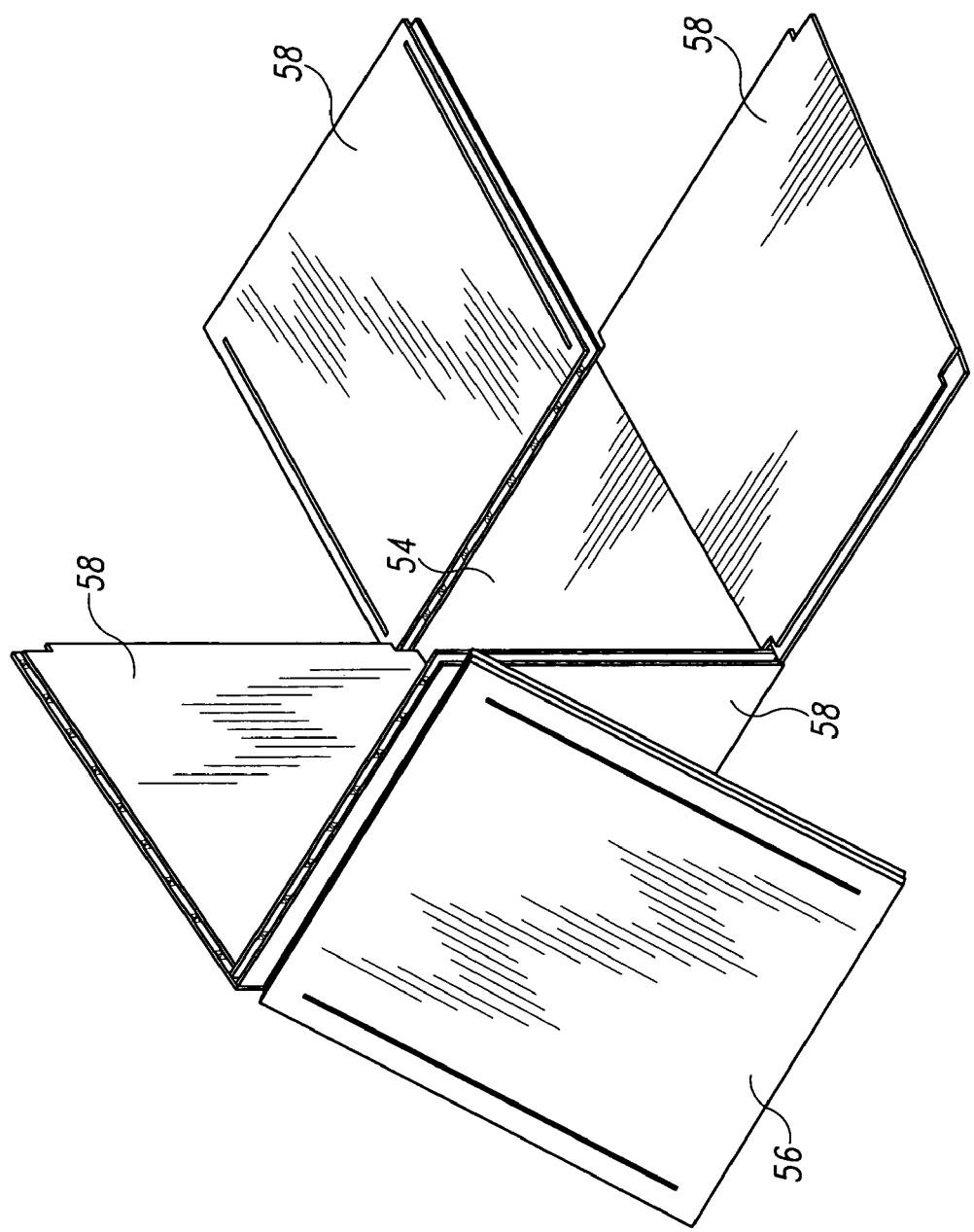
Figure 9:
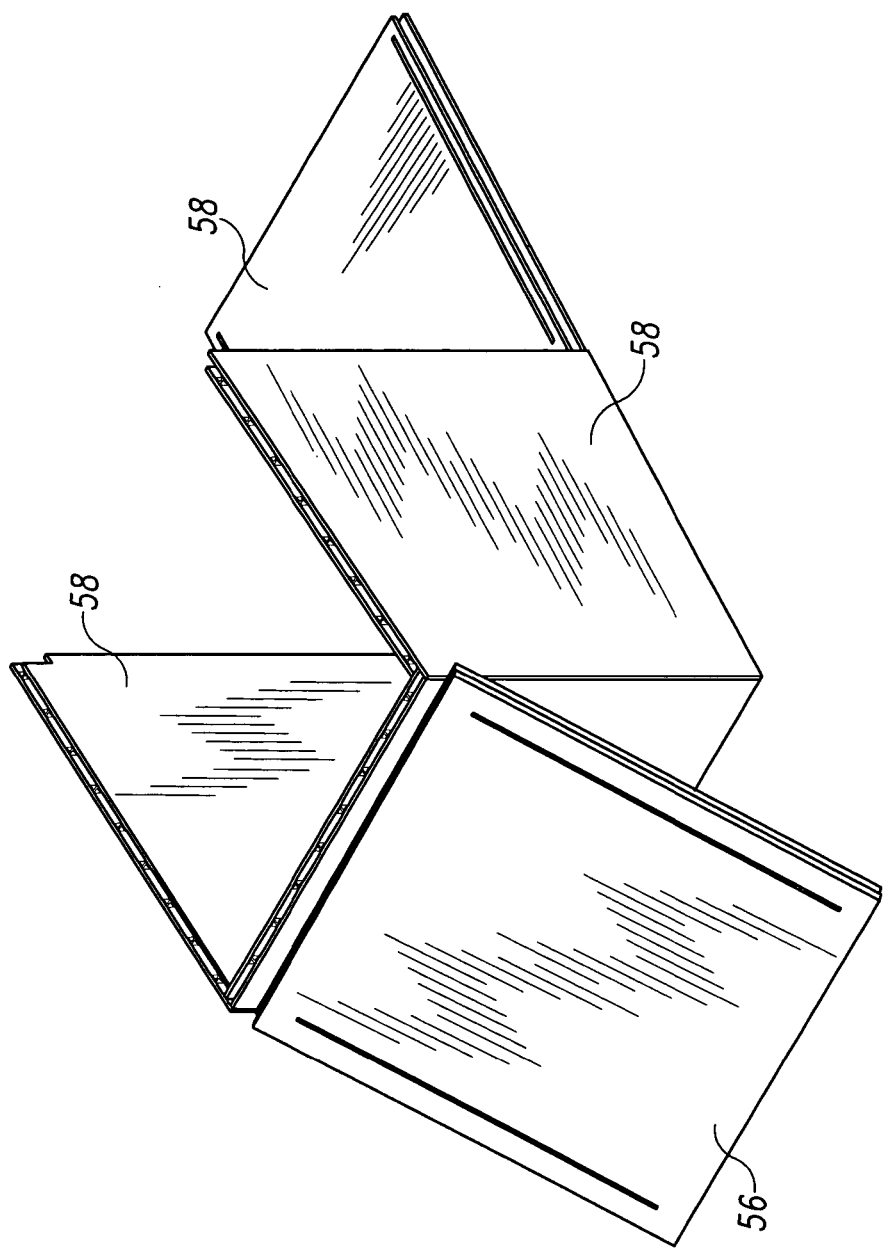

Side walls 58 are then raised to a vertical position and adjacent side walls 58 are connected to one another, as shown in FIGS. 7-9. Edges 46 of side walls 58 may be received in slots 60 formed in one or more interior panels 14 to connect adjacent side walls 58.

Roof 56 is secured to two opposite side walls 58, as shown in FIG. 10. Slots 60 formed in interior panel 14 of roof 56 receive top edges 46 of the two opposite side walls 58. The material 42 is introduced into cavities 40 to complete construction of the shelter 52. One or more doors (not shown) and/or windows (not shown) may be formed in one or more of side walls 58. The shelter 52 may thus be readily assembled.

Upon assembly of the shelter 52, the shelter 52 is configured to deflect or otherwise resist impact forces (e.g., ballistic and blast forces). The exterior panels 12 are configured to resist the impact forces. When the material 42 is configured as an energy dissipation material, the material 42 may be used to absorb the kinetic energy imparted to the exterior panels 12 by the impact forces. The interior panels 14 may be used to provide an additional impact-resistant layer.

To disassemble the shelter 52, each release 44 is activated to remove the material 42 from the cavities 40. The structures 54, 56, 58 are detached from one another and moved to their collapsed and folded positions for transport and storage. The shelter 52 may thus be readily disassembled.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. A shelter, comprising:
a floor,
a roof, and
a plurality of side walls secured to the floor and the roof, wherein at least one of the floor, the roof, and the plurality of side walls comprises an exterior panel, an interior panel and an attachment device, the attachment device including (i) a first plate coupled to the exterior panel, (ii) a second plate coupled to the interior panel, and (iii) a third plate pinned to the first and second plates respectively for relative rotation between the third plate and the first plate about a first axis of rotation and for relative rotation between the third plate and the second plate about a second axis of rotation such that during relative movement of the exterior panel and the interior panel between a collapsed position and an expanded position in which the exterior panel and the interior panel are spaced farther apart from one another than in the collapsed position to define a cavity therebetween, the third plate pivots between a position in which the third plate is positioned oblique to the first and second plates and a position in which the third plate is generally perpendicular to the first and second plates.

2. The shelter of claim 1, wherein each of the exterior panel and the interior panel comprises a fiber reinforced polymer.

3. The shelter of claim 1, wherein the exterior panel comprises an outer layer, an inner layer, and a plurality of fibers interconnecting the outer layer and the inner layer.

4. The shelter of claim 3, wherein:
the interior panel comprises an outer layer, an inner layer, and a plurality of fibers interconnecting the outer layer and the inner layer, and
the cavity is defined between the inner layer of the exterior panel and the inner layer of the interior panel.

5. The shelter of claim 4, further comprising a filler material disposed in the cavity.

6. The shelter of claim 5, further comprising a release configured to release the filler material from the cavity.

7. The shelter of claim 6, wherein the inner and outer layers of at least one of the interior panel and the exterior panel are generally parallel planar structures and wherein the at least one interior panel or exterior panel further comprises a core positioned between the inner and outer layer and the plurality of fibers coupled to each of the inner and outer layers extends through the core such that the fibers are generally perpendicular to the inner and outer layers.

8. The shelter of claim 7, wherein at least one of the plurality of side walls further comprises a cover secured to the exterior panel.

9. The shelter of claim 8, wherein the cover comprises a ballistic grade material.

10. The shelter of claim 1, wherein:
each of the exterior panel and the interior panel comprises an outer layer, an inner layer, and a plurality of fibers interconnecting the outer layer and the inner layer,
the first plate is secured to the inner layer of the exterior panel, and
the second plate is secured to the inner layer of the interior panel.

11. The shelter of claim 10, wherein the inner and outer layers of at least one of the interior panel and the exterior panel are generally parallel planar structures and wherein the at least one interior panel or exterior panel further comprises a core positioned between the inner and outer layer and the plurality of fibers coupled to each of the inner and outer layers extends through the core such that the fibers are generally perpendicular to the inner and outer layers.

12. The shelter of claim 11, wherein at least one of the plurality of side walls further comprises a cover secured to the exterior panel.

13. The shelter of claim 12, wherein the cover comprises a ballistic grade material.

14. The shelter of claim 1, wherein the exterior panel is a composite.

15. The shelter of claim 14, wherein the interior panel is not a composite.

16. The shelter of claim 15, wherein the inner panel comprises a ballistic grade material.

17. The shelter of claim 1, further comprising a filler material disposed in the cavity.

18. The shelter of claim 17, further comprising a release configured to release the filler material from the cavity.

19. A structure comprising
a floor,
a roof,
a plurality of side walls secured to the floor and the roof, wherein at least one side wall comprises a first panel, a second panel and an attachment device, the attachment device including (i) a first plate coupled to the first panel, (ii) a second plate coupled to the second panel, and (iii) a third plate pinned to the first and second plates respectively for relative rotation between the third plate and the first plate about a first axis of rotation and for relative rotation between the third plate and the second plate about a second axis of rotation such that during relative movement of the first panel and the second panel between a collapsed position and an expanded position in which the first panel and the second panel are spaced farther apart from one another than in the collapsed position to define a cavity therebetween, the third plate pivots between a position in which the third plate is positioned oblique to the first and second plates and a position in which the third plate is generally perpendicular to the first and second plates, wherein at least one of the first and second panels comprises a fiber-reinforced composite material including (i) an inner generally planar layer, (ii) an outer generally planar layer, (iii) a core positioned between the inner and outer layers, and (iv) a plurality of fibers coupled to each of the inner and outer layers, the plurality of fibers extending through the core such that the fibers are generally perpendicular to the inner and outer layers, a cover secured to at least one of the first and second panels, the cover comprising a ballistic grade material, and an energy dissipating material positioned in the cavity.

* * * * *